Aug. 8, 1933.  M. L. FOX  1,921,025
HYDRAULIC SHOCK ABSORBER WITH REMOTE CONTROL AND ADJUSTING DEVICE
Filed Dec. 21, 1931   3 Sheets-Sheet 3

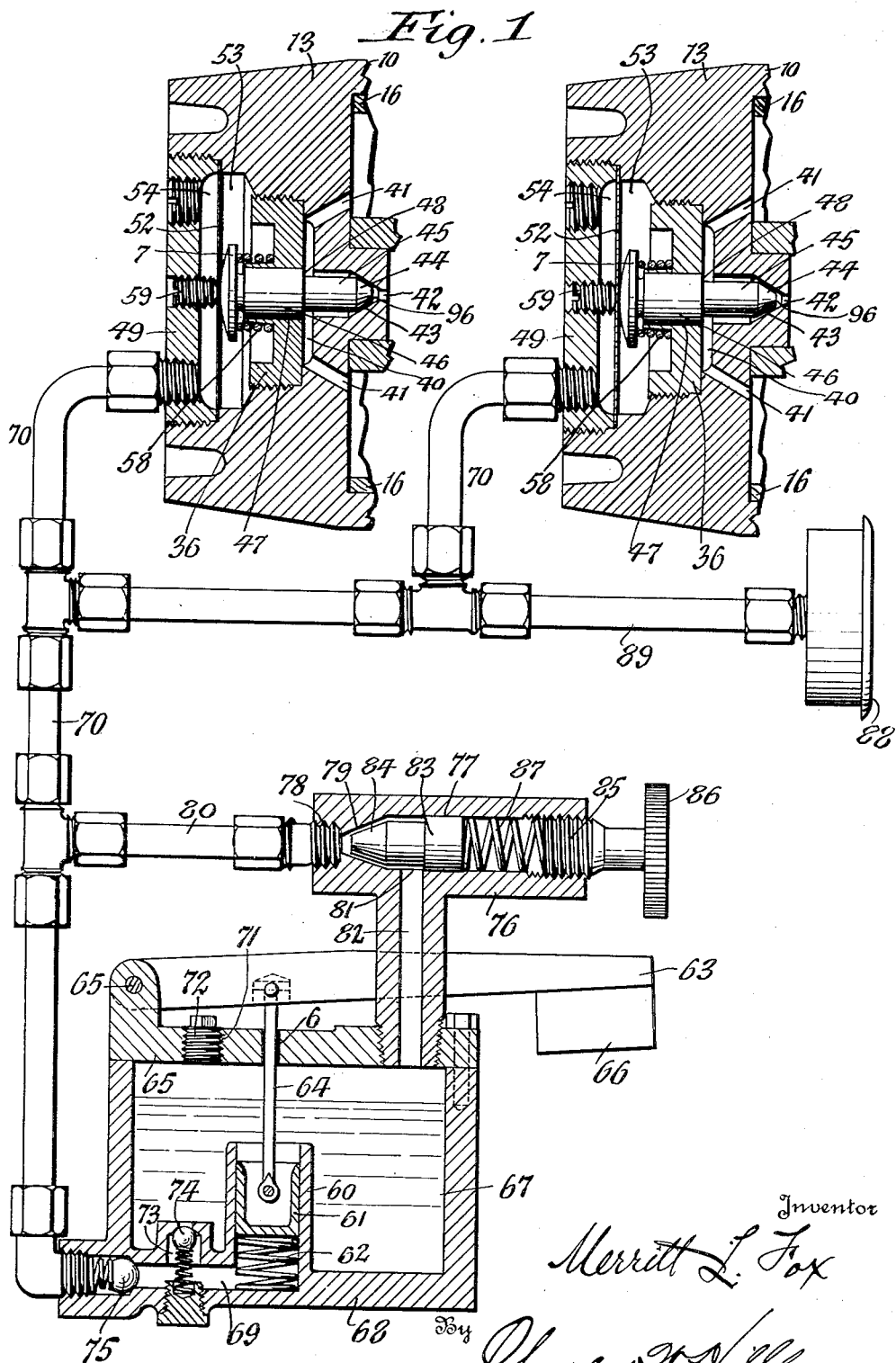

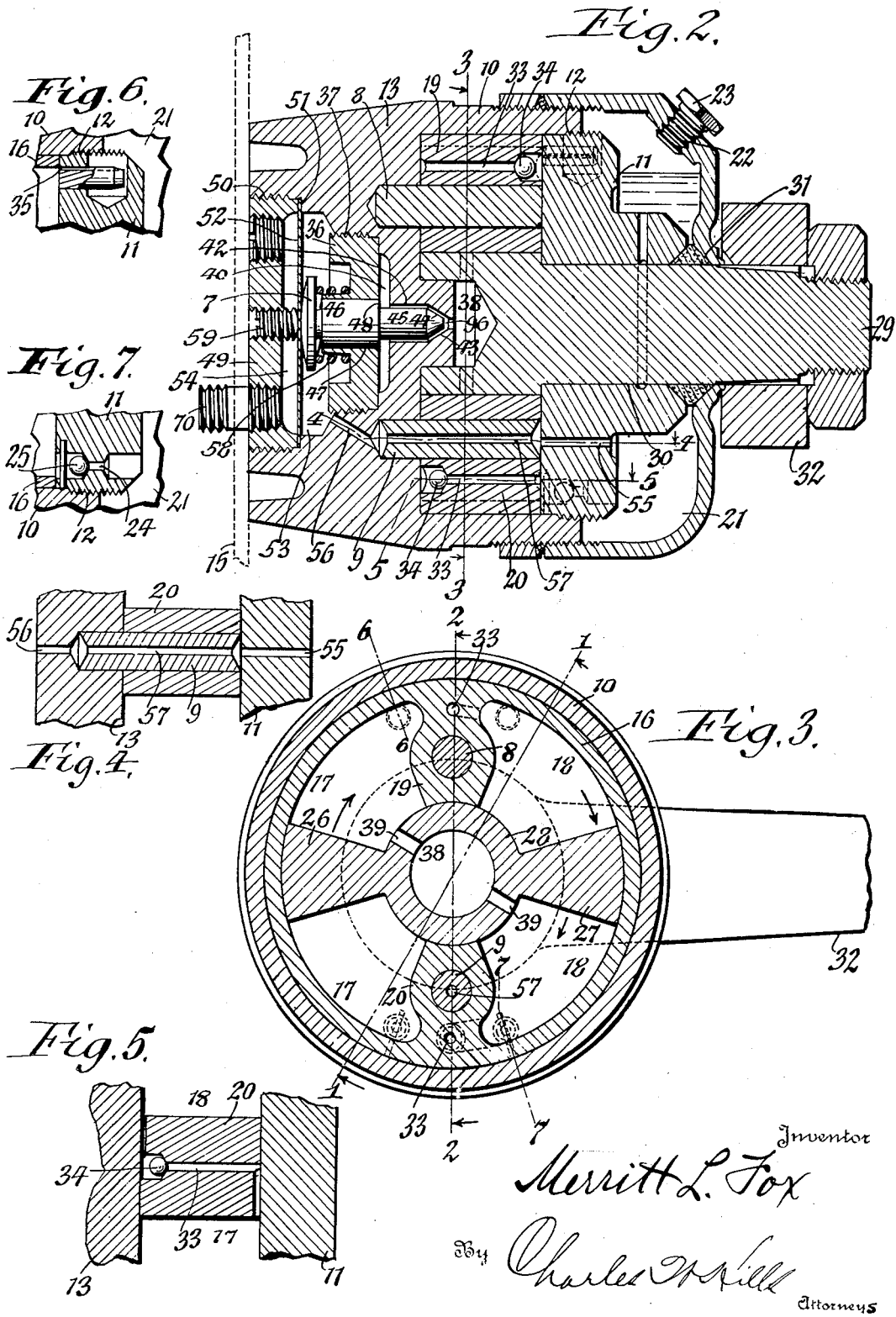

Inventor
Merritt L. Fox
By Charles H. Ville
Attorneys

Patented Aug. 8, 1933

1,921,025

UNITED STATES PATENT OFFICE 1,921,025

HYDRAULIC SHOCK ABSORBER WITH REMOTE CONTROL AND ADJUSTING DEVICE

Merritt L. Fox, Buffalo, N. Y., assignor to Houde Engineering Corporation, Buffalo, N. Y., a Corporation of New York Application December 21, 1931. Serial No. 582,342

4 Claims. (Cl. 188—89)

This invention relates to means for regulating the resistance or cushioning effect of hydraulic shock absorbers for automobiles or vehicles and more particularly to means which not only permit of manually adjusting the effect at a distance from the absorbers but also operate to automatically maintain such cushioning or resistance at the point where it has been set while the automobile or vehicle is in operation.

It is the object to provide adjusting means of this character for shock absorbers which are of simple construction, certain in operation and capable of being readily adjusted.

In the accompanying drawings:

Fig. 1 is a sectional diagrammatic view showing this invention embodied in a cushioning system containing a plurality of hydraulic shock absorbers, the section of the shock absorbers being taken on line 1—1, Fig. 3.

Fig. 2 is a vertical longitudinal section showing a preferred form of hydraulic shock absorber for use in connection with my invention, taken on line 2—2, Fig. 3.

Fig. 3 is a vertical transverse section of the same taken on line 3—3, Fig. 2.

Figures 4 and 5 are fragmentary longitudinal sections taken on lines 4—4 and 5—5, Fig. 2, respectively.

Figures 6 and 7 are fragmentary vertical longitudinal sections on lines 6—6 and 7—7, Fig. 3, respectively.

Figure 8:
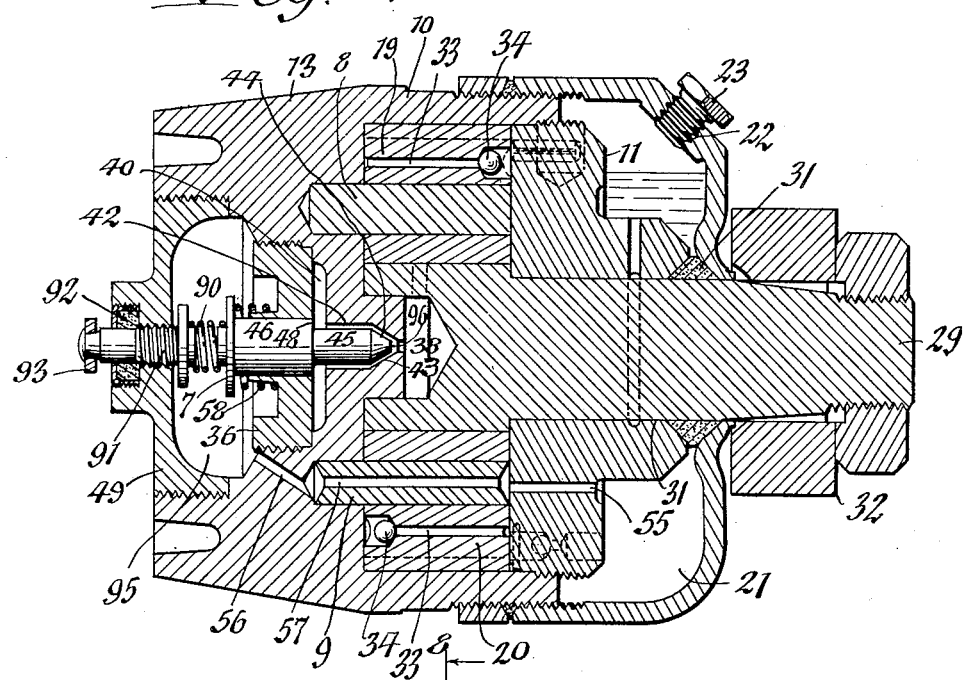
Figure 9:
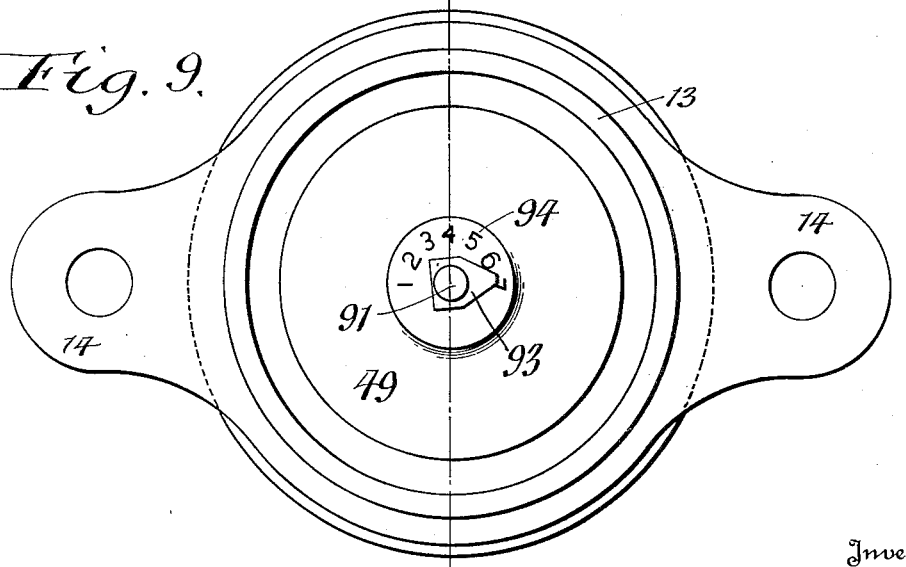

Fig. 8 is a vertical longitudinal section of a modified form of this improvement taken on line 8—8, Fig. 9.

Fig. 9 is a front elevation of the same.

In the following description similar characters of reference indicate like parts in the several figures of the drawings.

The hydraulic shock absorber shown in the drawings, as an example of a suitable form for use in connection with my invention has a body which comprises a cylindrical side wall 10, a front head 11 connected with the front end of the side wall by a screw joint 12 and a rear head 13 formed integrally with the rear end of the side wall. This body may be mounted on the frame of the automobile in any suitable manner but preferably by lugs 14 projecting laterally from the side wall and bolted to the longitudinal bar 15 of the automobile frame. The bore of the side wall is provided with a circular lining 16 and the space within this lining and the front and rear heads of the body is divided into two substantially semi-cylindrical working chambers 17, 18 by a partition consisting of upper and lower radial sections 19, 20 formed integrally with the lining 16 and projecting inwardly therefrom and separated from each other at their inner ends by an intervening space. The lining 16 and the partition sections are held against turning in the working chambers by upper and lower dowels 8, 9, projecting through these partition sections and into the rear head 13, as shown in Figs 2, 3 and 4.

The working chambers are fitted with a resistance liquid and this is supplied to the same from a replenishing chamber 21 arranged on the front end of the body and having an inlet opening 22 normally closed by a plug 23 and adapted to deliver resistance liquid to one or both of the working chambers at the lower ends thereof through one or two replenishing ports or passages 24 arranged in the lower part of the front head 11 and each containing a check valve 25 opening toward the respective working chamber and closing toward the replenishing chamber, as shown in Fig. 7.

Within the two working chambers two pistons 26, 27, are adapted to oscillate, respectively, these pistons being arranged on diametrically opposite sides of a hub 28 whose axis coincides with that of the working chambers and whose periphery engages on diametrically opposite parts with the inner ends of the partition sections 19, 20. From the front end of the piston hub an operating shaft 29 projects forwardly through a bearing 30 on the front head 11 in which the shaft is journaled and also through a packed opening 31 in the front side of the replenishing chamber. At its front end the operating shaft is connected with an operating arm or lever 32 which is connected in any suitable manner with the adjacent axle of the car or other part which moves relatively to the body or frame thereof while the car is running over uneven surfaces. When the body and axles of the car are moved toward each other the pistons move backwardly in the working chambers with low pressure strokes from the high pressure ends of the working chambers toward the low pressure ends of the same, as indicated by the direction of the arrow in Fig. 3. At this time the resistance liquid is capable of flowing with comparative freedom from the low pressure end of one working chamber to the high pressure end of the other working chamber through a bypass 33 arranged in each of the partition sections and containing a check valve 34 which opens toward the high pressure end of one working chamber and closes toward the low pressure end of the other working chamber as shown in Fig. 5 and thereby produce a relatively light shock absorbing or cushioning effect. During rebound or separation of the body and axles of the car the check valves 25 close and the pistons move from the low pressure ends toward the high pressure ends of the working chambers opposite to the direction indicated by the arrow in Fig. 3, whereby the resistance liquid is prevented from flowing through the by-passes 24 and a relatively high shock absorbing effect is produced due to the resistance liquid being trapped to a greater extent in the high pressure ends of the working chambers and therefore impede the movement of the pistons toward these ends accordingly.

During the oscillations of the pistons any air in the resistance liquid is permitted to escape from the working chambers into the replenishing chamber through one or more vents 35 in the upper part of the front heat 11, as shown in Fig. 6.

The means for regulating the resistance or cushioning effect of the shock absorber in accordance with my invention are constructed as follows:—

The numeral 36 represents a plug secured by a screw joint 37 within the rear head 13. A regulating passage or conduit is provided which establishes communication between the high and low pressure ends of the several working chambers which passage or conduit comprises a high pressure regulating chamber 38 formed between the piston hub 28 and the rear head 13 and connected by radial high pressure ports 39 with the high pressure ends of the working chambers, as shown in Figs. 2 and 3, a low pressure regulating chamber 40 formed between the rear head 13 and the plug 36 and connected by low pressure ports 41 with the low pressure ends of the working chambers, and an axial valve port 42 connecting the high and low pressure regulating chambers and having a valve seat 43 which faces rearwardly. The numeral 44 designates a regulating valve which is movable axially toward and from the valve seat and is arranged on the front end of a valve stem which has a front section 45 of comparatively small diameter arranged within the valve port 42 and the low pressure regulating chamber 40 and a rear section 46 of comparatively large diameter which slides axially in a guide opening 47 in the center of the plug 36, thereby forming a forwardly facing shoulder 48 of comparatively large flat area around the central part of this valve stem which is exposed to the pressure of the resistance liquid in the low pressure regulating chamber 40 while the valve 45 exposes a relatively smaller flat area 96 to the resistance liquid in the high pressure regulating chamber 38, as shown in Figs. 1 and 2.

In the rear end of the rear head of the body a cover 49 is secured by a screw joint 50 and between the marginal part of this cover and a shoulder 51 on the adjacent part of the rear body head is clamped the edge portion of a diaphragm 52 so as to form a balancing chamber 53 between the front side of this diaphragm and the adjacent part of the inner plug 36 and the rear body head 13 and a controlling chamber 54 between the rear side of the diaphragm and the rear cover 49, as shown in Figs. 1 and 2. A balancing passage between the balancing chamber 53 and the replenishing chamber is provided by ports 55, 56, 57 formed respectively in the lower parts of the front and rear heads of the body, and in the lower dowel 9, as shown in Figs. 2 and 4.

At its rear end the regulating valve stem is provided with an enlarged button 7 bearing against the front side of the diaphragm against which it is yieldingly held by a spring 58 interposed between the inner plug 36 and said button. Undue rearward deflection of the diaphragm under the pressure of the spring 58 and the resistance liquid against the regulating valve stem is prevented by a stop 59, consisting preferably of an adjustable screw secured to the cover 49 and engaging with the rear side of the diaphragm 52.

Means are provided whereby a selected pressure may be maintained within the controlling chamber which pressure may be adjusted in order to obtain the required resistance or cushioning effect of the shock absorber.

Constancy of pressure in the controlling chamber is produced automatically by utilizing the vertical vibrations of the car body as the source of power and the regulation of the degree of resistance or cushioning effect is effected by manually adjustable means which are preferably arranged remote from the absorber and readily accessible from the driver's seat so that the latter can adjust the controlling mechanism manually while the car is in operation.

The means for creating pressure in the controlling chamber 54 comprise a vibration operated pump which may consist of an upright cylinder or barrel 60 mounted on any suitable part of the car so as to vibrate vertically therewith, a plunger 61 reciprocating vertically within the barrel, a spring 62 arranged between the bottom of the barrel and the underside of the plunger, a vertically swinging rock lever 63 connected by a link 64 with said plunger and pivoted at one end by a fulcrum 65 to a support 65 and a weight 66 mounted at the opposite end of said lever 63. During the vibration of the car on which this pump is mounted spring 62 and weight 66 operate to rock the lever 63 and the latter in turn reciprocates the plunger in the pump barrel which motion is utilized to cause a column of liquid to transmit pressure the rear side of the diaphragm.

The controlling liquid for this purpose may be supplied from a tank or reservoir 67 on the bottom 68 of which the pump barrel mounted and the cover on top of which preferably forms the support 65 for the rocking pump lever. This cover is provided with an opening 6 for the passage of the link 64. Within its bottom the pump tank is provided with a passage 69 which connects at its inner end with the lower end of the pump barrel while its outer end is connected with the controlling chamber 54 by a pipe 70. Liquid is supplied to the tank through an opening 71 in its top which is normally closed by a plug 72 and the liquid is supplied to the pump barrel through a delivery port 73 in the bottom of the tank which leads from the interior of the latter to the passage 69. The port 73 is controlled by a check valve 74 which opens inwardly or toward the pump and beyond this inlet port 73 the passage 69 is provided with a check valve 75 which closes inwardly. During the upward stroke of the pump plunger liquid is drawn from the tank past the check valve 74 into the pump barrel and during the downward stroke of the plunger the liquid in the barrel is discharged past the check valve 75 in the controlling pipe 70.

Means are provided whereby the pressure pump is permitted to create and maintain a predetermined pressure on the column of liquid between the pump barrel and the diaphragm, but when the liquid pressure of this column exceeds the degree for which the apparatus has been set then the excess liquid supplied by the pump to the column will be permitted to escape and in the preferred construction is returned to the supply tank 67. The means for this purpose shown in the drawings comprise a regulating valve having a body 76 provided with a bore 77, an inlet 78 at the front end of said bore having a valve seat 79 and connected with the controlling pipe by a return pipe 80, an outlet 81 at the side of the bore connected by discharge pipe 82 with the cover of the tank 67, a valve stem 83 slidable lengthwise in the bore 77 and having a relief valve 84 at its front end which is movable toward and from the valve seat 79, a screw plug 85 working in the rear end of said bore 77 and provided with an external handle 86, and a spring 87 arranged within said bore between said valve stem and screw plug 85. By turning this plug the required extent sufficient tension may be produced on the spring 87 to hold the valve 84 against its seat 79 until the pressure in the controlling pipe exceeds the degree for which the apparatus has been set, and when such excess pressure occurs the relief valve 84 opens and permits the excess liquid to pass through the relief valve body and return to the storage tank 67. By turning the plug 85 so as to increase or decrease the tension of the spring 87 the amount of pressure on the controlling column of liquid may be varied to suit the cushioning effect of the shock absorbers necessary to properly carry any particular load or to suit roads of different characters or other conditions.

In the operation of this shock absorber the resistance liquid is forced under comparatively low pressure from the low pressure ends of the working chambers 17, 18 through the low pressure ports 41 into the low pressure chamber 40, thence through the valve port 42, thence through the high pressure chamber 38, and thence through the high pressure regulating ports 39, 39 to the high pressure ends of the working chambers. At this time the pistons are moved in the direction of the arrows associated with the same in Figure 3 due to the axle and frame of the car moving toward one another, as would be the case if the wheels of the car ran over an obstruction in the roadway. During the high pressure strokes of the pistons when the same move in a direction opposite to the arrows associated therewith in Figure 3, the resistance liquid flows successively from the high pressure ends of the working chambers 17, 18, through the high pressure regulating ports 39, 39, the high pressure regulating chambers 38, the valve port 42, low pressure regulating chamber 40, and the low pressure regulating ports 41, 41 into the low pressure ends of the working chambers. The freedom of flow of the resistance liquid in the manner just described is governed by the position of the regulating valve 44 relative to the seat 43, this flow being retarded to a greater extent and the rigidity or resistance effect of the absorber being increased as the regulating valve seat 44 is moved toward the valve 43 and decreased as the regulating valve moved away from this seat. The regulating valve 44 is moved away from its seat by the pressure of the resistance liquid against the front side or face of the regulating valve 44 and the shoulder 48 between the small front part 45 and the large rear part 46 of the regulating valve stem together with the rearward pressure of the spring 58 against the button 7, which movement of the regulating valve is resisted by the pressure of the column of controlling liquid in the pipe 70 and the passages and spaces connected therewith. By varying the pressure of this controlling liquid column the position of the regulating valve 44 relative to the seat 43 may be varied, thereby restricting the freedom of flow of the resistance liquid from one end of the working chambers to the other and varying the shock absorbing capacity of the instrument accordingly. The pressure of the controlling liquid column is produced by the action of the pump plunger 61 which is reciprocated by the vibratory lever 63 when the car is in operation, but can also be operated by hand to effect the initial pressure of the controlling liquid column on the diaphragm 52.

The degree of rigidity or cushioning effect of the absorber may be adjusted by turning the screw plug 85 so as to increase or decrease the tension of the spring 87 and thereby vary the degree of pressure in the controlling liquid column accordingly. When the pressure in the controlling column is normal, or below normal, then the controlling valve 84 will be held shut by the spring 87 while the pump plunger 61 is operating to raise this pressure to normal, but when the pressure of controlling liquid column rises above normal then this excess pressure will force the controlling valve 84 away from its seat 79 by overcoming the tension of the spring 87, whereupon some of the liquid in the controlling column will be released and permitted to flow back from the pressure pipe 70 through the return pipe sections 80, 82 and controlling valve body 76 into the pump reservoir or tank 67 preparatory to be used over again. By locating the hand wheel 86 within convenient reach of the driver of the car the adjustment of the shock absorbing effect of the instrument can be regulated while the car is in operation to suit varying road conditions and load conditions as desired. In order to note the particular resistance pressure under which the shock absorber is operating a pressure indicator 88 is provided, the same being connected with the pressure pipe 70 by a branch pipe 89 and preferably so located that the same may be observed by the driver while occupying his usual seat.

If desired a single liquid pressure control means of this character may be employed individually for each shock absorber of a car or a plurality of shock absorbers may be connected with a single control means, an example of the last mentioned character being shown in Fig. 1 in which a pair of shock absorbers are connected with a single liquid pressure control means in accordance with this invention.

This system of control is self equalizing, because the same control pressure is exerted on all shock absorbed which are connected with the control means, and also maintains equal pressures in the working chambers of the several shock absorbers because the control liquid operates directly on the diaphragms which act on the pressure regulating valves of the several shock absorbers.

In this shock absorber the diameter of the enlarged rear part 46 of the regulating valve stem is determined by the desired area of the annular shoulder or ring 48 which is in contact with the working or resistance liquid. The area 48 of the annular shoulder and the area 96 of the small end of the regulating valve 44 should be in the same ratio to each other as the desired ratio of pressures in the high pressure and low pressure ends of the working chambers.

During the high pressure or high resistance strokes of the working pistons the resistance liquid from the high pressure ends of the working chambers bears mainly against the small front end of the regulating valve 44. During the low resistance or pressure strokes of the working pistons the resistance liquid from the low pressure ends of the working chambers bears mainly against the annular shoulder 48 of the regulating valve stem. In both of these cases the pressure of the working liquid is thus balanced by the force of the spring 58 against one side of the diaphragm 52 and the pressure of the column of control liquid against the opposite side of the diaphragm. Since the force due to this spring and the force due to this controlling liquid column are constant for any particularly setting, then the ratio of the resistance produced by the high and low pressure strokes of the working pistons will be determined by the ratio of the area of the small end of the regulating valve 44 relative to the area of the annular shoulder 48 on the valve stem. This system, therefore, has the advantage of giving a predetermined ratio of high to low resistance strokes of the working pistons. It also furnishes an automatic balancing of the resistance which is offered by all the shock absorbers which are operatively connected; it eliminates the necessity of setting the shock absorbers to a predetermined resistance and maintains a balance between them notwithstanding that one shock absorber may wear faster than the others; and it avoids the necessity of using any thermostat control means inasmuch as the shock absorbers are regulated by the pressure control line, which controls the pressure in the several shock absorbers independent of the number employed and also regardless of the viscosity of the working or resistance liquid which is used.

The modified form of this improvement shown in Figs. 8 and 9 is constructed as follows:

In general the organization of the absorber proper in this modified form is the same as that shown in Figs. 2-7 and differs therefrom in the means whereby the extent of opening of the regulating valve may be adjusted and the cushioning or resisting effect of each absorber may be adjusted independently of others employed on the same car.

The diaphragm and liquid pressure column means are omitted from this modified construction and in its stead a valve closing spring 90 is interposed between the front end of the stem 45, 46 and the rear end of an adjusting screw 91 which threadingly works in an opening in the center of the cover 49 and passing through a stuffing box 92 on the latter. Upon turning this screw by means of a handle 93 on the front end thereof the tension of the closing spring 90 may be varied so that the regulating valve 44 will resist the flow of liquid from one end of a working chamber to the other the required extent to produce the desired shock absorbing effect of the instrument to suit a particular load or installation. Such adjustment however does not disturb the ratio of the differential in pressure between the high and low pressure ends of each working chamber but instead increases or decreases the pressures in these ends in the same measure. For convenience in determining the setting of the regulating valve from the exterior of the instrument the handle 93 is made in the form of a pointer and this traverses a graduated scale 94 on the outer side of the cover 49, as shown in Fig. 9.

By turning the adjusting screw so that the same moves inwardly the tension of the closing spring 90 is increased and the absorber will take care of heavier shocks and upon moving this screw outwardly the tension of the closing spring is reduced and the absorber permits the car to ride easier. The operation of each absorber may in this manner be adjusted independently of the remaining absorbers on the car and thus enable the cushioning effect on the car to adjust the load on the same. For example, the instruments on the front of the car may be made to operate more rigidly than those on the rear of the car, and vice versa. Also the absorbers on one side of the car may be made to operate softer or harder relative to the opposite side if certain loading conditions make this desirable or necessary.

Inasmuch as the diaphragm 52 employed in the construction shown in Figs. 1 and 2 is omitted in the construction shown in Fig. 8 the space between the outer cover 49 and the inner plug 36 forms a single balancing or equalizing chamber 95 which communicates by the passages 55, 56 and 57 with the replenishing chamber 21, as shown in Fig. 8.

I claim as my invention:

1. A hydraulic shock absorber comprising a body having a working chamber which is adapted to contain a resistance liquid and in one end of which the liquid is subjected to high pressure and in the opposite end thereof to low pressure, and said body having a regulating conduit connected at one of its ends with the high pressure end of said working chamber and at its opposite end with the low pressure end of the working chamber, and a regulating valve arranged in said regulating conduit and having a face of relatively small area subject to the initial movement of the liquid from the high pressure end of the working chamber and a relatively large area subject to the initial movement of the liquid from the low pressure end of the working chamber, an opening spring for assisting the opening of said valve, a closing spring for resisting the opening of said valve, and an adjusting screw mounted on said body and cooperating with said closing spring for varying the tension of the latter.

2. A hydraulic shock absorber comprising a body having a working chamber adapted to contain a resistance liquid and in one end of which the liquid is subject to high pressure and in the opposite end thereof to low pressure and said body also having a regulating conduit one end of which is connected with the low pressure end of the working chamber and the other end of this regulating conduit being connected with the high pressure end of said working chamber and said regulating conduit containing a valve seat, means for regulating the flow of liquid through said regulating conduit including a valve stem having a small front part provided with a valve movable toward and from said seat and presenting a face of comparatively small area to the high pressure end of said regulating conduit and said stem having a large rear part forming a shoulder of comparatively large area between said front and rear parts of the valve stem which is presented to the low pressure end of said regulating conduit, a diaphragm bearing on one side against said valve stem, and a controlling conduit containing a controlling liquid column bearing against the opposite side of said diaphragm, the relative ratio of the areas of the front face and the rear shoulder of the valve stem being so determined that the pressure of the controlling liquid column will be constant for any setting of the instrument to suit a particular load imposed on the instrument.

3. In a hydraulic shock absorber comprising a body having a working chamber which is adapted to contain a resistance liquid and in one end of which the liquid is subjected to high pressure and in the opposite end thereof to low pressure, and said body having a regulating conduit connected at one of its ends with the high pressure end of said working chamber and at its opposite end with the low pressure end of the working chamber, a regulating valve arranged in said regulating conduit and having a face of relatively small area subjected to the pressure of the liquid when flowing from the high pressure end of the working chamber and a relatively large area subjected to the pressure of the liquid when flowing from the low pressure end of the working chamber, yielding means tending to move said valve in opening direction, and an adjustable yieldable abutment for limiting opening movement of the valve.

4. A hydraulic shock absorber comprising a body having a working chamber which is adapted to contain a resistance liquid and in one end of which the liquid is subjected to high pressure and in the opposite end thereof to low pressure, and said body having a regulating conduit connected at one of its ends with the high pressure end of said working chamber and at its opposite end with the low pressure end of the working chamber, a regulating valve arranged in said regulating conduit and having a front face of relatively small area subjected to the pressure of the liquid when flowing from the high pressure end of the working chamber and a rear shoulder having a relatively large area subjected to the pressure of the liquid when flowing from the low pressure end of the working chamber, adjustable yielding means for limiting the opening movement of said valve, the relative ratio of the areas of the front face and the rear shoulder of the valve stem being so determined that the resulting pressure tending to open said valve will be the same for the high pressure flow and the low pressure flow.

MERRITT L. FOX.